May 28, 1940.  J. H. SHERTS  2,202,675
ACIDPROOF CONTAINER
Filed Feb. 25, 1939

INVENTOR
JAMES H. SHERTS
BY Olew E. Bee
ATTORNEY

Patented May 28, 1940

2,202,675

UNITED STATES PATENT OFFICE 2,202,675

ACIDPROOF CONTAINER

James Hervey Sherts, Pittsburgh, Pa., assignor to Pittsburgh Plate Glass Company, Allegheny County, Pa., a corporation of Pennsylvania Application February 25, 1939, Serial No. 258,524

2 Claims. (Cl. 206—2)

The present invention relates to containers and more particularly to an assembled container for corrosive liquids.

One object of the present invention is the provision of an acidproof container formed of glass plates which are interlocked in such manner that no supplementary braces or supporting structure are necessary.

Other objects and advantages of the invention will become more apparent from the following detailed description of a preferred embodiment thereof.

I am aware that attempts have been made to fabricate acidproof containers from glass plates, but in every instance it has been necessary to reinforce the glass structure with a wood or metal case, or other type of braces. I am also aware that acidproof containers have been molded from glass, but it will at once be obvious that the size of such pressed or blown containers is materially limited. Where, therefore, it is desired to prepare very large receptacles for corrosive liquids other materials have been pressed into service. For example, iron and steel have been widely used and the inner surfaces have been treated or protected with a rubber lining vulcanized into plates. Other protective coating such as enamels or synthetic resins have been used, but these are accompanied by danger of separation and contamination of liquid contained in the receptacle.

Briefly stated, the present invention contemplates the fabrication of acidproof containers from molded glass plates which may be tempered to increase their strength and which are so interlocked that additional supporting framework is unnecessary.

A preferred embodiment of my invention is illustrated in the accompanying drawing, wherein.

Figure 1:
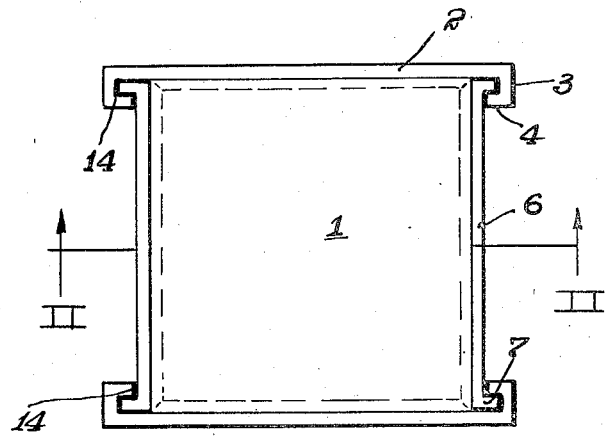
Figure 1 is a plan view of a container fabricated from glass plates.
Figure 2:
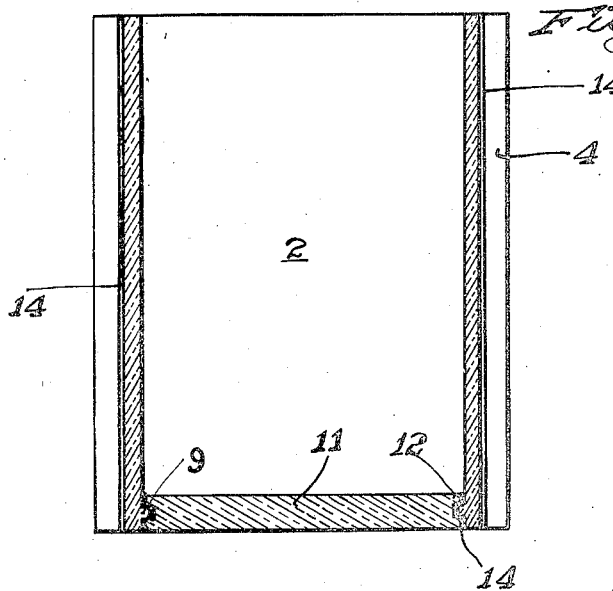
Figure 2 is a vertical sectional view taken substantially upon the line II—II of Figure 1.
Figure 3:
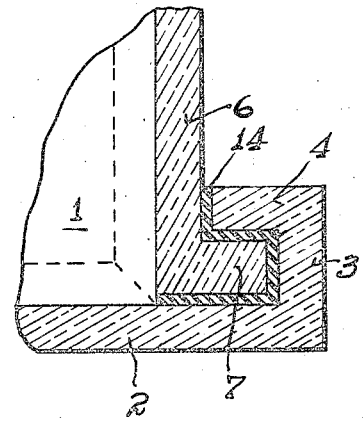
Figure 3 is a fragmentary horizontal sectional view on an enlarged scale showing in detail the manner of interlocking the glass plates.
Figure 4:
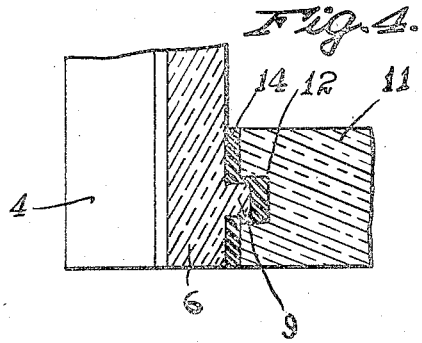
Figure 4 is a fragmentary vertical sectional view on an enlarged scale, showing in detail the manner of securing the base plate to the container.

Referring to the drawing, a container 1 comprises a pair of face plates 2 of vitreous material, such as cast ceramic or glass, so molded that it is substantially of C shape in cross-section. The plates 2 are provided along their vertical edges with flanges 3 terminating in the lips 4, which are reversed to extend inwardly. Side plates 6 which are also formed of glass or cast ceramic are molded and have outwardly-extending flanges 7 upon both vertical edges. Both the face plates 2 and side plates 6 are provided with tongues or ledges 9 extending from the inner faces thereof adjacent the lower ends of the plates. A bottom plate 11 of glass or cast ceramic is provided with an edge groove 12 which engages the ledge 9, thus locking the bottom plate into the structure. The adjacent glass surfaces are prevented from contacting one another by a filling 14 of acid-resisting caulking compound, such as resin, pitch or rubber.

The fabrication of these containers as contemplated by my invention is comparatively simple. The glass plates 2 and 6 which have been molded and tempered, if so desired, are placed upon two sides of the molded base plate 11 with the ledges 9 engaging the groove 12 in the base plate. One of the side plates 6 is then dropped into position with the flanges 7 interlocking with the overlapping lips 4 of the face plates. The plate 6, which is then in place, is moved as far as possible to one side and the base plate 11 is moved in a similar manner toward the same side. The remaining side plate is then lowered into position, sufficient clearance having been established to permit the ledge 9 on the side plate to pass the edge of the base plate 11. After the several plates have been assembled they are centered and the filling of mastic or acid-resisting caulking compound is applied to the space between the glass plates at the vertical edges of the container and around the bottom at the joints between the side and face plates and the bottom.

Since the four corners of the container are interlocked there is no possibility of displacement of one of the plates sufficient to break the seal created by the caulking material. The interlocking of the side and face plates also prevents displacement of the bottom plate and the engagement of the horizontal tongue with the groove in the base plate, reinforcing the structure to an even greater degree.

While the invention has been described as applicable to the reception and retention of acids, it is intended that the containers will serve to hold other corrosive liquids as well.

It will at once be obvious that various modifications in the several elements and their arrangement is possible without departing from the spirit of the invention or the scope of the appended claims.

What I claim is:

1. A container for liquids comprising face plates of glass substantially of C shape in cross-section, side plates of glass provided with flanges extending along the edges thereof and interlocking with the face plates, a horizontal ledge extending from the inner faces of the face and side plates adjacent the lower ends thereof, a bottom plate of glass provided with an edge groove into which the ledge enters and locks, and a filling of chemical-resistant caulking compound separating the adjacent glass surfaces.

2. A construction as defined in claim 1, in which the several plates are formed of tempered glass.

JAMES HERVEY SHERTS.